(12) United States Patent
Parrish

(10) Patent No.: US 7,790,128 B2
(45) Date of Patent: Sep. 7, 2010

(54) HYDROGEN PEROXIDE CATALYTIC DECOMPOSITION

(75) Inventor: Clyde F. Parrish, Melbourne, FL (US)

(73) Assignee: United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 1497 days.

(21) Appl. No.: 10/641,581

(22) Filed: Aug. 8, 2003

(65) Prior Publication Data

US 2004/0197252 A1  Oct. 7, 2004

Related U.S. Application Data

(60) Provisional application No. 60/461,533, filed on Apr. 4, 2003.

(51) Int. Cl.
  *B01D 53/56* (2006.01)
(52) U.S. Cl. .................................. 423/235; 423/385
(58) Field of Classification Search .............. None
  See application file for complete search history.

(56) References Cited

U.S. PATENT DOCUMENTS

| | | | |
|---|---|---|---|
| 3,333,419 A | | 8/1967 | Baumgartner |
| 4,213,944 A | * | 7/1980 | Azuhata et al. ............ 423/235 |
| 4,341,747 A | * | 7/1982 | Downey ..................... 423/235 |
| 5,120,508 A | * | 6/1992 | Jones ......................... 422/171 |
| 5,670,122 A | * | 9/1997 | Zamansky et al. ......... 423/210 |
| 5,863,413 A | * | 1/1999 | Caren et al. ................ 205/688 |
| 6,039,783 A | * | 3/2000 | Lueck et al. .................. 71/59 |
| 6,676,912 B1 | * | 1/2004 | Cooper et al. ............. 423/235 |
| 6,793,903 B1 | * | 9/2004 | Parrish ....................... 423/400 |

OTHER PUBLICATIONS

C. Kappenstein, "Formation of Singlet Oxygen and OH Radical During Catalytic Decomposition of H2O2 and Possible Role for Hybrid Engine," 5th International Hydrogen Peroxide Propulsion Conference, Purdue University, West Lafayette, IN, USA, pp. 103-111, Sep. 15-19, 2002.

C. Kappenstein et al., "Catalytic Decomposition of H2O2. Comparison of Unsupported and Alumina Supported Manganese Oxide Catalysts,", 1st Hydrogen Peroxide Propulsion Workshop, University of Surrey, Guildford, Surrey, UK, Jul. 29-31, 1998.

(Continued)

*Primary Examiner*—Stanley Silverman
*Assistant Examiner*—Paul A Wartalowicz
(74) *Attorney, Agent, or Firm*—Randall M. Heald; Thomas W. Leffert

(57) ABSTRACT

Nitric oxide in a gaseous stream is converted to nitrogen dioxide using oxidizing species generated through the use of concentrated hydrogen peroxide fed as a monopropellant into a catalyzed thruster assembly. The hydrogen peroxide is preferably stored at stable concentration levels, i.e., approximately 50%-70% by volume, and may be increased in concentration in a continuous process preceding decomposition in the thruster assembly. The exhaust of the thruster assembly, rich in hydroxyl and/or hydroperoxy radicals, may be fed into a stream containing oxidizable components, such as nitric oxide, to facilitate their oxidation.

14 Claims, 2 Drawing Sheets

OTHER PUBLICATIONS

P.W. Morlan et al., "Silver Screen Catalyst Bed Design for a Pressure Fed Liquid Fueled Upper Stage Engine," 1st Hydrogen Peroxide Propulsion Workshop, University of Surrey, Guildford, Surrey, UK, Jul. 29-31, 1998.

J.S. Mok et al., "Staged Thermal Decomposition and Vaporization of High Concentration Hydrogen Peroxide," 5th International Hydrogen Peroxide Propulsion Conference, Purdue University, West Lafayette, IN, USA, pp. 223-244, Sep. 15-19, 2002.

J. Whitehead, "Hydrogen Peroxide Propulsion for Smaller Satellites," 1st Hydrogen Peroxide Propulsion Workshop, University of Surrey, Guildford, Surrey, UK, Jul. 29-31, 1998.

J. Mooi, "Catalytic Decomposition of Hydrogen Peroxide over Supported Oxides of Manganese," J. Am. Chem. Soc., vol. 72, pp. 4333-4334, 1950.

S. Noda et al., "Gas-Phase Hydroxyl Radical Generation by the Surface Reactions over Basic Metal Oxides," J. Phys. Chem., B (1998), 102, 3185-3191.

G. Grigoryan, "Radical Decomposition of Hydrogen Peroxide," Khim. Zh. Arm., vol. 49, No. 4, pp. 118-128, 1996.

N. Davis et al., "Design of Cast Packs for the Decomposition of Hydrogen Peroxide," Presented at the ARS Propellants, Combustion and Liquid Rockets Conference, The Ohio State University, Columbus, OH, USA, Jul. 18-19, 1960.

M. Long et al., 5th International Hydrogen Peroxide Propulsion Conference, Purdue University, W. Lafayette, IN, USA, pp. 193-204, Sep. 15-19, 2002.

* cited by examiner

HYDROGEN PEROXIDE CATALYTIC DECOMPOSITION

RELATED APPLICATION

This application claims priority to U.S. Provisional Patent Application Ser. No. 60/461,533 filed Apr. 4, 2003 and titled "Hydrogen Peroxide Catalytic Decomposition," which is commonly assigned and incorporated by reference herein.

STATEMENT OF GOVERNMENT INTEREST

The invention described herein was made by an employee of the United States Government and may be manufactured and used by or for the Government of the United States of America for governmental purposes without the payment of any royalties thereon or therefor.

TECHNICAL FIELD OF THE INVENTION

The present invention relates generally to decomposition of hydrogen peroxide and in particular to the decomposition of hydrogen peroxide into oxidative free radicals to oxidize nitric oxide to nitrogen dioxide.

BACKGROUND OF THE INVENTION

A significant problem associated with the removal of nitric oxide (NO) from a flue-gas stream with a wet scrubber is the oxidation of NO to nitrogen dioxide ($NO_2$). In particular, the crux of the problem with the capture of NO is its limited solubility, which requires oxidation to $NO_2$. Current processes for reducing $NO_x$ emissions from fossil-fired power plants are the Selective Catalytic Reduction (SCR) and Non-Selective Catalytic Reduction (NCSR) processes. The disadvantages of the SCR and the NSCR processes are their high maintenance, capital and operating cost.

In an effort to overcome the problems associated with conventional SCR and NSCR processes, and the difficulty scrubbing NO with the process developed by the applicant and a fellow inventor (U.S. Pat. No. 6,039,783, issued Mar. 21, 2000 to Lueck et al.). The applicant came up with a process for decomposing hydrogen peroxide to oxidize the NO in flue gases to $NO_2$, which may then be removed from the gas stream by the process described in U.S. Pat. No. 6,039,783.

For the reasons stated above, and for other reasons stated below that will become apparent to those skilled in the art upon reading and understanding the present specification, there is a need in the art for alternative methods and apparatus for removing nitric oxide from gaseous streams.

SUMMARY

The present invention improves on the capabilities of the technology referenced above. In particular, the present invention provides an innovative method for the decomposition of hydrogen peroxide to produce oxidative species capable of oxidizing nitric oxide (NO) to nitrogen dioxide ($NO_2$), based on rocket thruster technology.

The invention further includes methods and apparatus of varying scope.

DETAILED DESCRIPTION OF THE INVENTION

Figure 1:
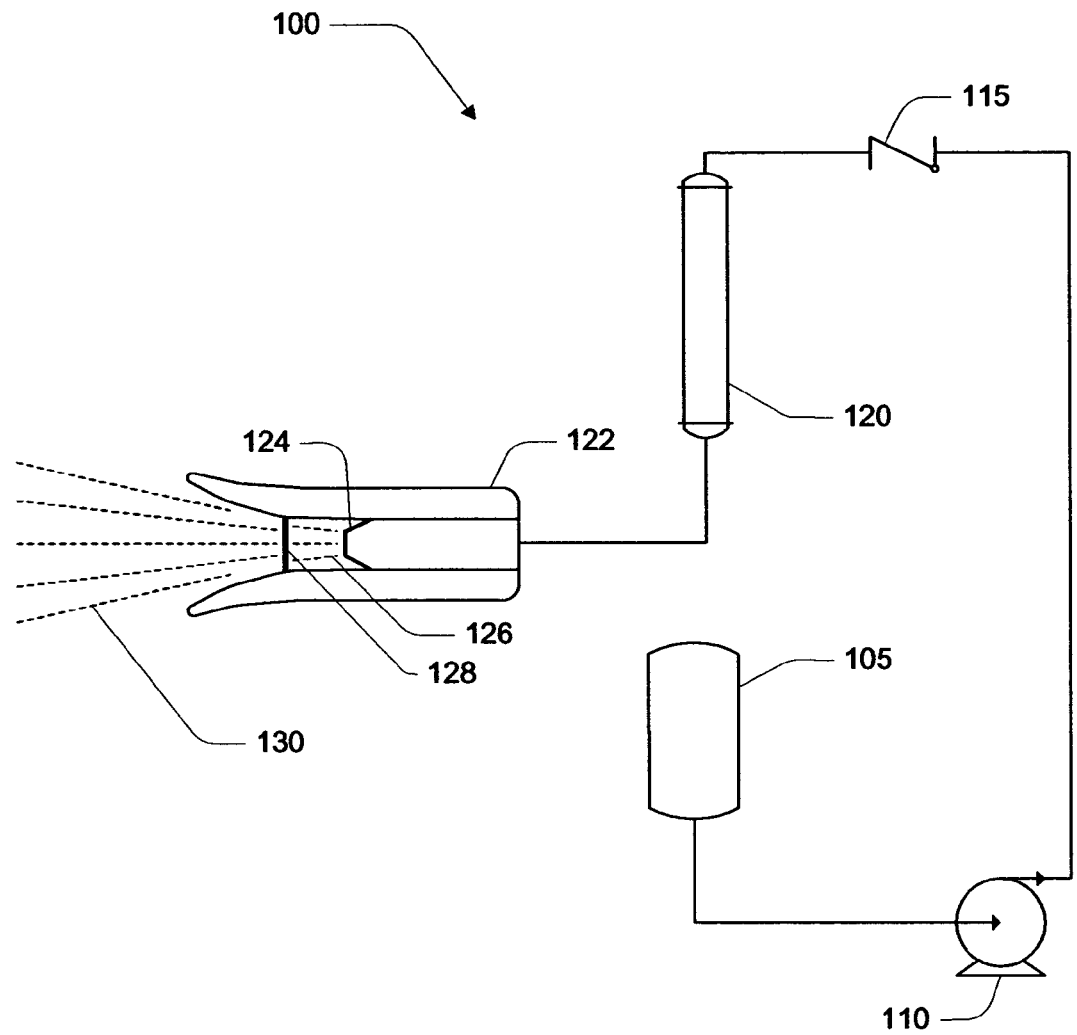
FIG. 1 is a schematic of a system for decomposing hydrogen peroxide for use with an embodiment of the invention.

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and chemical changes may be made without departing from the spirit and scope of the present invention. The following detailed description is, therefore, not to be taken in a limiting sense, and the scope of the present invention is defined only by the appended claims and equivalents thereof.

It is well known that hydrogen peroxide in the concentration range from 70 to 98 wt-percent will act as a monopropellant in a rocket engine if the proper catalyst is utilized. One example of a catalyst utilized in rocket thrusters is silver gauze; however, it is well known that many metals and metal oxides also will catalyze the rapid decomposition of hydrogen peroxide.

What is new and innovative is the use of rocket thruster technology to generate oxidative species from hydrogen peroxide that is capable of oxidizing NO to $NO_2$. There are many references that speak of the use of hydrogen peroxide as a rocket fuel, some over 60 years old. While these references describe various stages of the process, only those reactions that lead to the formation of hydroxyl and hydroperoxyl radicals will be effective in oxidizing NO to $NO_2$. A presentation by Charles Kappenstein entitled "Formation of Singlet Oxygen and OH Radical During Catalytic Decomposition of $H_2O_2$ and Possible Role for Hybrid Engine" summarized this problem and provided examples of effective catalysts. See C. Kappenstien, "Formation of Singlet Oxygen and OH Radical During Catalytic Decomposition of $H_2O_2$ and Possible Role for Hybrid Engine," $5^{th}$ International Hydrogen Peroxide Propulsion Conference, Purdue University, W. Lafayette, Ind., USA, pp 103-111, Sep. 15-19, 2002.

The present invention is directed to integrating thruster technology with the web scrubber technology to provide a unique solution to the problem of converting NO to $NO_2$. The thrusters may be distributed across the flue gas stack and employ a thruster nozzle(s) similar to the nozzle developed by Matthew Long as reported in a presentation entitled "Bi-centrifugal swirl injector development for hydrogen peroxide and non-toxic hypergolic miscible fuels" which article is incorporated into the present disclosure by reference thereto. M. Long et al., 5th International Hydrogen Peroxide Propulsion Conference, Purdue University, W. Lafayette, Ind., USA, pp 193-204, Sep. 15-19, 2002. The bi-centrifugal swirl injector described in the Long et al. reference provides a cone pattern that would give good mixing of the oxidative species generated by the thruster. The primary intent of this design is to mix bipropellants, but the design concepts could be applied to a monopropellant such as hydrogen peroxide. This design uses multiple inlets to provide a uniform spray pattern and to avoid damage to the injector during start-up. The bi-centrifugal design has two sets of inlets, but for the monopropellant only one set of inlets would be required. The injectors produced wide-angle cones with half-angles of 35 to 42 degrees. To avoid burning inside the injector, gas exit velocities were designed to be in excess of 20 m/s. The reported combustion efficiencies were as high as 86 percent. Such a design would give a wide dispersion as needed for complete interaction with the NO in the flue-gas stream.

The present invention is believed to provide a unique combination of the proven technology of hydrogen peroxide thrusters and the technology utilized in the conversion of NO to $NO_2$. Whereas previous methods have utilized heated catalytic surfaces to decompose hydrogen peroxide that was enriched, if necessary, to approximately 70 percent by passing it though a heated nozzle (70 percent is generally the highest concentration of hydrogen peroxide that can be shipped without restriction, but 50 percent is more common). In comparison, the present invention provides a process wherein 50 percent hydrogen peroxide can be concentrated on site with existing technology, if necessary, then pumped to the thruster where it will decompose without added heat applied onto the surface of the thruster catalyst. With the present invention, concentrated hydrogen peroxide, e.g., 70 percent or more, is pumped to the thruster array where it decomposes to hydroxyl and hydroperoxyl radicals, which serve to oxidize NO to $NO_2$.

The present invention enhances the technology disclosed and claimed in applicant's issued Pat. No. 6,039,783, which is commonly assigned. The present invention has particular adaptability to use in all fossil-fuel power plants in oxidizing of NO to $NO_2$.

The various embodiments of the invention utilize concentrated hydrogen peroxide ($H_2O_2$) to form hydroxyl (HO•) and hydroperoxy (HOO•) free radicals by passing the $H_2O_2$ through a thruster assembly, the $H_2O_2$ acting as a monopropellant. The resulting free radicals may be used for the oxidation of gas stream components, such as nitric oxide produced in a combustion process.

Hydrogen peroxide was first used as a monopropellant over forty years ago in attitude control thrusters for the X-15 and Mercury spacecrafts. In these applications, hydrogen peroxide was decomposed over a silver catalyst. When hydrogen peroxide is decomposed the reaction intermediates can be hydroxyl and hydroperoxyl free radicals. The combustion products, water and oxygen, have an adiabatic decomposition temperature of 980° C. for 100 percent hydrogen peroxide but at 67 percent there is barely sufficient energy to boil the exhausted water. The adiabatic temperature of the hydrogen peroxide exhaust gases is dependent on the concentration of hydrogen peroxide and influences the formation of the free radical intermediates, which is important for the conversion of NO to $NO_2$.

Kappenstein examined the formation of singlet oxygen ($^1O_2$) and hydroxyl free radicals from a thermodynamic and kinetic point of view, and then based on literature he reviewed he showed that both reactants could be formed by the decomposition of hydrogen peroxide on selective catalysts. Single oxygen oxidizes compounds at low temperatures that do not react with triplet oxygen ($^3O_2$) in the ground state. The HO• and HOO• radicals result from the strongly endothermic cleavage of O—O and H—O bonds of hydrogen peroxide. Based on the literature, the reactivity of HO• is much greater than $^1O_2$, which is 4 to 5 orders of magnitude greater than $^3O_2$. Although $Mn_xO_y$ (manganese oxide) is a very reactive catalyst for the decomposition of hydrogen peroxide, it is reported to only produce $^3O_2$. However, these observations are not supported by the data presented by Mooi who reports that the decomposition of hydrogen peroxide by $Mn_xO_y$, supported on $\gamma$-$Al_2O_3$ produces HO• radicals. See J. Mooi, "Catalytic Decomposition of Hydrogen Peroxide over Support Oxides of Manganese," J. Am. Chem. Soc., Vol. 72, pp 4333-34, 1950. Based on the literature reported by Kappenstein the most active heterogeneous catalyst for the formation of singlet oxygen are immobilized molybdenum oxides ($Mb_xO_y$) on solid substrates. Noda reports that surface reactions over basic metal oxides produce HO. with residence times of 4 ms. See S. Noda, et al., "Gas-Phase Hydroxyl Radical Generation by the Surface Reactions over Basic Metal Oxides," J. Phys. Chem. B (1998), 102, 3185-3191. The formation of HO• and HOO• from hydrogen peroxide that is decomposed by a platinum catalyst supported on dielectric substrates ($SiO_2$, $\gamma$-$Al_2O_3$, MgO) was reported by Grigoryan. See, G. Grigoryan, "Radical Decomposition of Hydrogen Peroxide," Khim. Zh. Arm., Vol. 49, No. 4, pp 118-128, 1996. These radicals were not only formed on the surface of the dielectric substrates, but in all cases they escaped into the gas phase as determined by electron spin resonance (ESR).

From the discussion above it is important to not only decompose hydrogen peroxide, but to decompose it so that HO• is preferentially formed. Based on the formation of singlet oxygen with molybdenum oxide catalysts and the uncertainty of the products from manganese oxides it appears that both catalysts should be used in a mixed catalyst pack. Our laboratory results show a significant increase in the oxidation of NO to $NO_2$ when molybdenum oxides are used as compared with manganese oxides. The method for the preparation of this mixed catalyst pack is given below.

The method reported by Mooi impregnates high surface area $\gamma$-$Al_2O_3$ support with a solution of manganous nitrate, which is dried and calcined at 200° C. The final product contains 3 to 4 wt-% Mn with an average oxidation state of 3.6. Kappenstein's method used manganese (II) nitrate, ammonium permanganate, and manganese hydroxide to prepare the oxides used in his study. The alumina ($Al_2O_3$) was treated with aqueous solution to give loadings from 0.6 to 6.8 wt-% Mn. The catalyst samples were dried and then calcined at 150, 300, or 600° C. The approach that would be followed to produce the molybdenum oxides would be similar to the method Kappenstein used for manganese oxides.

This mixed catalyst pack can be fabricated into a thruster configuration to provide a simple direct method to generate oxidative free radicals. Davis has provided a guide for the fabrication of a thruster that could be used in this system. See, N. Davis, et al., "Design of Catalyst Packs for the Decomposition of Hydrogen Peroxide," Presented at the ARS Propellants, Combustion and Liquid Rockets Conference, The Ohio State University, Columbus 10, Ohio, Jul. 18-19, 1960. The Davis et al. report emphasizes the use of solid silver catalyst packs, although others are reported in the article. Samarium oxide ($Sm_2O_2$) coated silver (Ag) screen was the primary catalyst system used at the time this article was published (1960). Typically, the $Sm_2O_2$/Ag screen is tightly compressed (1800 to 3000 psi). The thicker the catalyst packs the easier it is to start the thruster at ambient temperatures. The use of wetting agents decrease the start-up time, but can cause serious screen erosion, which results in shortened catalyst pack lifetimes. Other parameters that influence the performance of the catalyst pack are reaction pressures; typically the reaction chamber pressure is in the range of 425 psia and temperature of the hydrogen peroxide. Mechanical design parameters, well understood in the art, depend on the application, but control feed rate of $H_2O_2$, and can provide anti-channel baffles, catalyst pack support, and catalyst pack compression. These systems have been designed for hydrogen peroxide concentrations from 70 to 99 percent volume. If the concentration of hydrogen peroxide is too low to produce the desired exhaust temperatures, external heaters can be added. The concentration of the oxidative free radicals can be measured by the change in the concentration of NO to $NO_2$ as measured by a chemiluminescent $NO_x$ analyzer.

FIG. 1 is a schematic of a system for decomposing hydrogen peroxide for use with an embodiment of the invention. The hydrogen peroxide solution is sourced from a storage vessel 105. For one embodiment, the hydrogen peroxide solution contained in storage vessel 105 has a concentration of approximately 30-50% by volume, although concentrations of up to approximately 70% by volume are known to be commercially available. Hydrogen peroxide solutions above about 70% by volume are generally considered to be unstable.

A pump 110 may be utilized to facilitate transfer of the hydrogen peroxide solution into the thruster assembly 122. Other means may also be used to transport the hydrogen peroxide solution into the thruster assembly 122. For example, the storage vessel 105 may be maintained at an elevated pressure. Additionally, the storage vessel 105 may be elevated above a point of entry into the thruster assembly 122 such that gravitational forces facilitate flow from the storage vessel 105 into the thruster assembly 122. A check valve 115 may be used to inhibit backflow within the system 100.

For one embodiment, a heat exchanger or preheater 120 is interposed between the storage vessel 105 and the thruster assembly 122. Preheated hydrogen peroxide solution will generally be more prone to decompose into its radicals, i.e., hydroxyl radicals and/or hydroperoxy radicals. However, it is noted that if concentrated hydrogen peroxide solution is used, e.g., approximately 70% or above by volume, preheater 120 would typically be eliminated. For a further embodiment, the preheater 120 brings the temperature of the hydrogen peroxide solution above its boiling point, thereby increasing its concentration. This will facilitate use of a higher concentration hydrogen peroxide solution within thruster assembly 122. For one embodiment, the preheater 120 brings the temperature of the hydrogen peroxide solution to approximately 140° C., which will generally increase its concentration to approximately 70% by volume. Preheating the hydrogen peroxide solution above its boiling point will vaporize a portion of the contained water, thus helping to propel the concentrated hydrogen peroxide solution through the nozzle 124 of the thruster assembly 122. The concentrated hydrogen peroxide solution is propelled through the nozzle 124 as a hydrogen peroxide spray 126. The hydrogen peroxide spray 126 is passed through the catalyst 128 to form an exhaust 128 containing hydroxyl and hydroperoxy radicals. If the concentration of hydrogen peroxide is too low to produce the desired exhaust temperatures, external heaters (not shown in FIG. 1) can be added. The resulting hydroxyl and hydroperoxy radicals may be used in the oxidation of nitric oxide to nitrogen dioxide.

Figure 2:
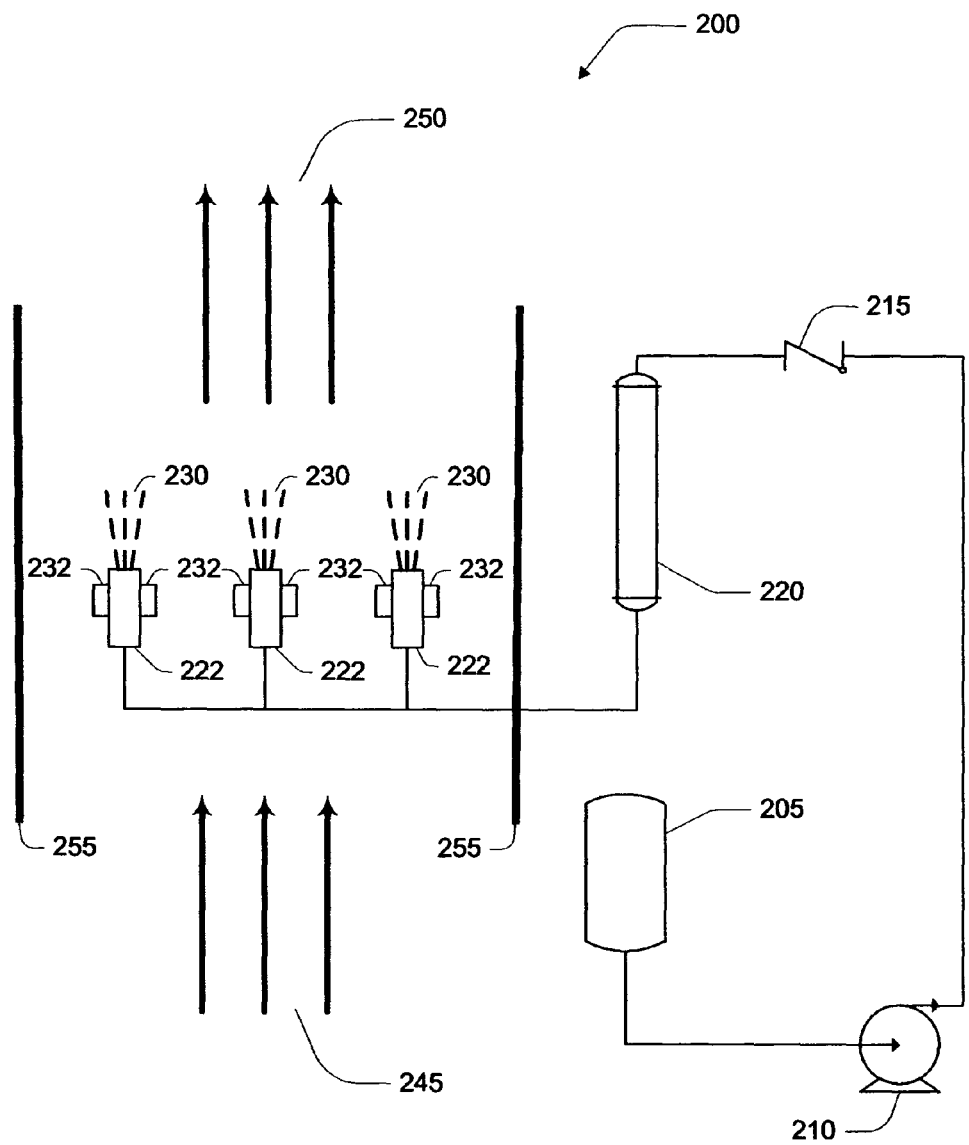
FIG. 2 is a schematic of a system for treating gas streams in accordance with a further embodiment of the invention.

FIG. 2 is a schematic of a system for treating gas streams in accordance with an embodiment of the invention. The gas treatment system 200 is adapted for the treatment of a gaseous stream 245 passing through a flow channel 255, such as a pipe or flue. The gas treatment system 200 of FIG. 2 will use hydrogen peroxide as an oxidizer source for use in treatment of the gaseous stream 245. For one embodiment, the gaseous stream 245 contains an oxidizable component. For a further embodiment, the oxidizable component is nitric oxide. The gaseous stream 245 may contain more than one oxidizable component. The gaseous stream 245 may further contain one or more non-oxidizable components. For one embodiment, the gaseous stream 245 comprises the gaseous by-products of a combustion process.

The hydrogen peroxide solution is sourced from a storage vessel 205. For one embodiment, the hydrogen peroxide solution contained in storage vessel 205 has a concentration of approximately 30-50% by volume, although concentrations of up to approximately 70% by volume are known to be commercially available. Hydrogen peroxide solutions above about 70% by volume are generally considered to be unstable.

A pump 210 may be utilized to generate a pressure of the oxidizer source greater than a pressure within the flow channel 255, thereby facilitating transfer of the hydrogen peroxide solution to one or more thruster assemblies 222. Other means may also be used to transport the hydrogen peroxide solution to the thruster assemblies 222. For example, the storage vessel 205 may be maintained at a pressure greater than that of the flow channel 255. Additionally, the storage vessel 205 may be elevated above a point of entry into the flow channel 255 such that gravitational forces facilitate flow from the storage vessel 205 through the thruster assemblies 222. A check valve 215 may be used to inhibit backflow within the system 200.

For one embodiment, a heat exchanger or preheater 220 is interposed between the storage vessel 205 and the flow channel 255. Preheated hydrogen peroxide solution will generally be more prone to decompose into its radicals, i.e., hydroxyl radicals and/or hydroperoxy radicals. However, it is noted that if concentrated hydrogen peroxide solution is used, e.g., approximately 70% or above by volume, preheater 220 would typically be eliminated. For a further embodiment, the preheater 220 brings the temperature of the hydrogen peroxide solution above its boiling point, thereby increasing its concentration. This will facilitate use of a higher concentration hydrogen peroxide solution during the treatment of the gaseous stream without requiring storage of hydrogen peroxide at increased concentration levels, which are more difficult and/or hazardous to contain. For one embodiment, the preheater 220 brings the temperature of the hydrogen peroxide solution to approximately 140° C., which will generally increase its concentration to approximately 70% by volume. Preheating the hydrogen peroxide solution above its boiling point will vaporize a portion of the contained water, thus helping to propel the concentrated hydrogen peroxide solution through the thruster assemblies 222. The thruster assemblies 222 are positioned to direct their exhausts 230 containing hydroxyl and hydroperoxy radicals into the flow channel 255. If the concentration of hydrogen peroxide is too low to produce the desired exhaust temperatures, external heaters 232 can be added to the thruster assemblies 222.

The hydroxyl and/or hydroperoxy radicals of the exhausts 230 generated from the decomposition of the concentrated hydrogen peroxide solution rapidly react with the one or more oxidizable components of the gaseous stream 245. The resulting exit gaseous stream 250 is thus reduced of its oxidizable components. As an example, where the gaseous stream 245 contains nitric oxide at the input of the flow channel 255, the gaseous stream 250 at the output of the flow channel 255 will have a reduced concentration of nitric oxide as at least a portion of the nitric oxide will have been oxidized to nitrogen dioxide. The output of the flow channel 255 may then be fed to a scrubber (not shown) for removal of the nitrogen dioxide.

CONCLUSION

Various embodiments have been described to convert nitric oxide to nitrogen dioxide using oxidizing species generated through the use of concentrated hydrogen peroxide fed as a monopropellant in a catalyzed thruster assembly. The hydrogen peroxide is preferably stored at stable concentration levels, i.e., approximately 50%-70% by volume, and may be increased in concentration in a continuous process preceding decomposition in the thruster assembly. The exhaust of the thruster assembly, rich in hydroxyl and hydroperoxy radicals, may be fed into a stream containing oxidizable components, such as nitric oxide, to facilitate their oxidation.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method of reducing a nitric oxide content of a gaseous stream, comprising:
    passing the gaseous stream through a flow channel;
    passing a hydrogen peroxide solution through a catalyzed thruster assembly adapted to exhaust at least hydroxyl radicals; and
    contacting the gaseous stream with the thruster assembly exhaust.

2. The method of claim 1, wherein passing the hydrogen peroxide solution through the catalyzed thruster assembly adapted to exhaust at least hydroxyl radicals further comprises passing the hydrogen peroxide solution through the thruster assembly containing at least one catalyst selected from the group consisting of metals and metal oxides.

3. The method of claim 1, wherein passing the hydrogen peroxide solution through the catalyzed thruster assembly adapted to exhaust at least hydroxyl radicals further comprises passing the hydrogen peroxide solution through the thruster assembly comprising at least one catalyst selected from the group consisting of silver, manganese oxides, molybdenum oxides and platinum.

4. The method of claim 3, wherein passing the hydrogen peroxide solution through the catalyzed thruster assembly adapted to exhaust at least hydroxyl radicals further comprises passing the hydrogen peroxide solution through the thruster assembly containing a mixed catalyst comprising manganese oxides and molybdenum oxides.

5. The method of claim 1, wherein passing the hydrogen peroxide solution through the catalyzed thruster assembly adapted to exhaust at least hydroxyl radicals further comprises passing the hydrogen peroxide solution through the catalyzed thruster assembly adapted to exhaust at least hydroxyl and hydroperoxy radicals.

6. The method of claim 1, further comprising:
    increasing a concentration of the hydrogen peroxide solution prior to passing the hydrogen peroxide solution through the catalyzed thruster assembly.

7. The method of claim 6, wherein increasing the concentration further comprises increasing the concentration from approximately 50% or less by volume to approximately 70% or more by volume.

8. The method of claim 6, wherein increasing the concentration of the hydrogen peroxide solution further comprises passing the hydrogen peroxide solution through a preheater.

9. The method of claim 8, wherein passing the hydrogen peroxide solution through a preheater Furth as increasing a temperature of the hydrogen peroxide solution to at least approximately 140° C.

10. The method of claim 6, further comprising:
    applying heat to the catalyzed thruster assembly while passing the concentrated hydrogen peroxide solution.

11. A method of reducing a nitric oxide content of a gaseous stream, comprising:
    passing the gaseous stream through a flow channel;
    passing a concentrated hydrogen peroxide solution through a catalyzed thruster assembly adapted to exhaust at least hydroxyl and hydroperoxy radicals; and
    contacting the gaseous stream with the thruster assembly exhaust.

12. The method of claim 11, wherein passing the concentrated hydrogen peroxide solution through the catalyzed thruster assembly adapted to exhaust at least hydroxyl and hydroperoxy radicals further comprises passing the concentrated hydrogen peroxide solution through the thruster assembly comprising at least one catalyst selected from the group consisting of silver, manganese oxides, molybdenum oxides and platinum.

13. The method of claim 11, further comprising passing a hydrogen peroxide solution through preheat crease a concentration of the hydrogen peroxide solution, thereby generating the concentrated hydrogen peroxide solution having a concentration of approximately 70% or more by volume.

14. The method of claim 11, further comprising:
    applying heat to the catalyzed thruster assembly while passing the concentrated hydrogen peroxide solution.

* * * * *